United States Patent [19]
Vergara et al.

[11] 3,829,177
[45] Aug. 13, 1974

[54] SECURITY DEVICE FOR BRAKING SYSTEMS

[76] Inventors: Jose D. Vergara, San Ismael No. 845 Jardine de la Preas; Adolfo Vergara, La Ryna No. 25 Col Chapalita; Juan L. Zepeda, Marelos No. 1024 Guadalyana, all of Guadalajara, Mexico

[22] Filed: Dec. 12, 1972

[21] Appl. No.: 314,430

[52] U.S. Cl. .............................................. 303/84 R
[51] Int. Cl. ............................................. B60t 15/46
[58] Field of Search ............ 303/84, 6, 10; 188/151, 188/152, 1 A; 137/498, 460, 465; 340/52 C

[56] References Cited
UNITED STATES PATENTS

| | | | |
|---|---|---|---|
| 2,093,015 | 9/1937 | Madden | 137/465 X |
| 2,970,607 | 2/1961 | Peck et al. | 303/84 A |
| 2,979,365 | 4/1961 | Jones | 303/84 A |
| 3,273,116 | 9/1966 | Quiros et al. | 303/84 A |
| 3,509,528 | 4/1970 | Wiley | 303/84 A |
| 3,658,391 | 4/1972 | Hensley | 303/84 A |

Primary Examiner—Duane A. Reger
Assistant Examiner—Charles E. Frankfort
Attorney, Agent, or Firm—Anthony A. O'Brien

[57] ABSTRACT

A security device for braking systems of the hydraulic type provides a signal to a driver indicating a presence of a small failure some place in the braking system and blocks a portion of the braking system where a major failure has occurred leaving the remaining portions of the system unchanged to permit safe driving of a vehicle without the complete failure of the braking system.

6 Claims, 5 Drawing Figures

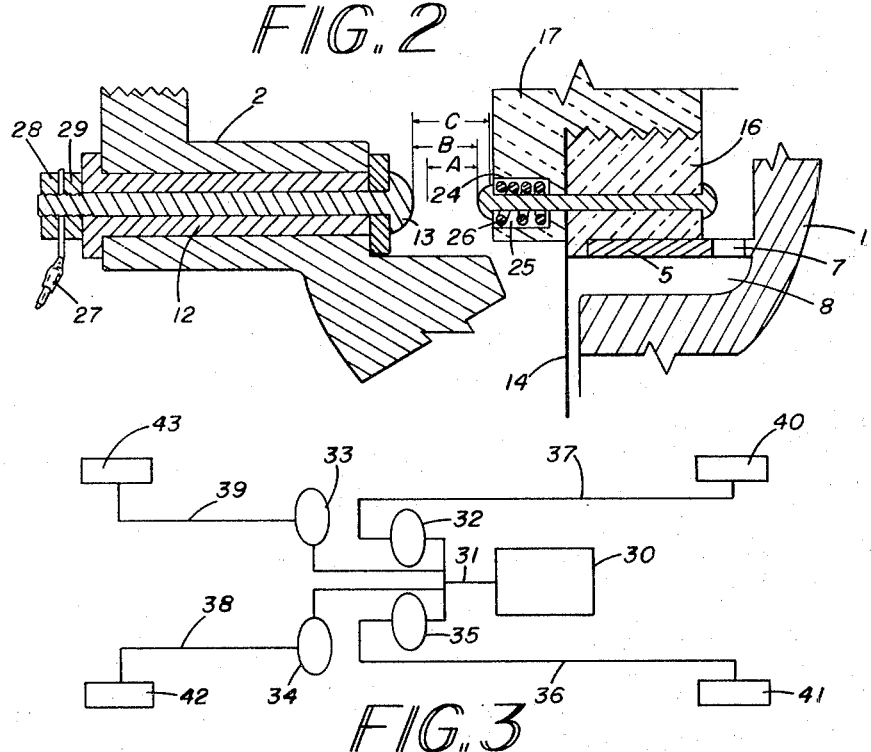
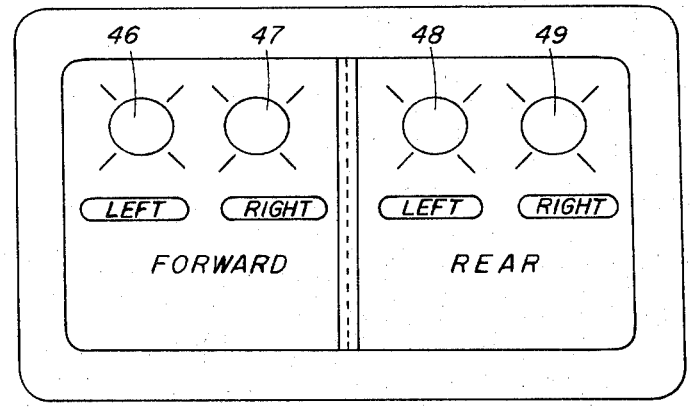

SECURITY DEVICE FOR BRAKING SYSTEMS

BACKGROUND OF THE INVENTION a. Field of the Invention

This invention relates to a security device for hydraulic braking systems and, more particularly, relates to a device designed to complement a hydraulic braking system which, in case of small failures provides a signal indicative thereof, and in case of major failures blocks that portion of the system where the failure is located thereby preventing a vehicle from entire loss of brakes.

b. Prior art

The use of hydraulic braking systems for automotive vehicles is well known, both for providing a braking action at the two rear wheels and for providing a braking action at all four wheels simultaneously. In such braking systems, any failure at a given portion of the system results in the complete absence of braking capacity. That is, a failure in any of the rubber seals, a puncture or breakage in the hoses, a loose connection or a condition caused by an impact with a foreign body in almost any part of the system, results in loss of liquid and, accordingly, pressure loss and failure of the brakes. The above conditions cannot be detected in prior art braking systems until at the moment the brakes are needed, thus creating emergency situations resulting in accidents or even deaths.

Accordingly, it would be highly convenient and advantageous to provide a braking system with a security device permitting the vehicle driver to be aware in due time of any failure in any given point of the braking system, notwithstanding the severity of the failure, and providing, in case of a serious failure, the feature of preventing the complete loss of the braking power of the system.

SUMMARY OF THE INVENTION

The present invention is generally summarized in a security device for use in a hydraulic braking system including a casing having an inlet, an outlet and a flow passage therebetween, a diaphragm disposed in the flow passage to define a first chamber communicating with the inlet and a second chamber communicating with the outlet, an elongate member disposed in the second chamber having a head defining a valve member, and a plunger fixed to the diaphragm including a passage having a first end communicating with the first chamber and a second end communicating with the second chamber and defining a valve seat, the plunger being movable with the diaphragm such that the valve seat engages the valve member to prevent flow through the passage in response to an abnormal pressure differential across the diaphragm.

Accordingly, it is an object of the present invention to provide a security device for hydraulic braking systems capable of preventing brake failures due to pressure loss.

It is another object of the present invention to provide a braking system with a security device which, along with preventing a possible failure at the system, avoids the loss of braking power by locking that portion of the system where a failure has occurred.

It is a further object of the present invention to provide a security device capable of providing an easily interpretable signal to a vehicle driver indicative of the condition of the brakes.

It is another object of the present invention to provide a braking system with a security device which, further to the failure indicating function, is provided with a blocking action in only a portion of the system, thus allowing braking pressure to be maintained at a satisfactory level in the remaining portion of the system.

It is still a further object of the present invention to provide a security device for a braking system which provides a failure signal and clearly points out in which portion of the system the failure occurs.

These and other objects and advantages of the present invention will become apparent from the following description of the preferred embodiment taken in conjunction with the accompanying drawings.

BRIEF DESCRIPTION OF THE DRAWINGS

FIG. 2 is a partial longitudinal sectional view showing the details of the operation of the electric contacts of the security device of the present invention.

FIG. 3 is a hydraulic system block diagram illustrating the position and form of placement of the security device of the present invention.

FIG. 5 illustrates a preferred embodiment for the failure-indicating board.

DESCRIPTION OF THE PREFERRED EMBODIMENT

Broadly stated, the security device of the present invention is a hydraulic actuating device adapted to be interposed in the hydraulic brake system of a vehicle, not substituting nor replacing the brake system, but complementing the same to provide a high degree of security in that it provides for the anticipated detection of failures that could result in a given pressure loss in the braking system as well as the blocking of a portion of the system where a major failure has occurred that could result, in the prior art systems, in the total loss of braking power for the vehicle. The first function, that is, the anticipated detection of the failure, is provided by the device of this invention by means of an electric system connected to certain portions of the security device so that, upon the occurrence of a failure downstream thereof, the device closes a circuit to give a signal that, in the embodiment herein disclosed, is a double signal, i.e., an easily understood sound and light signal in order to call the attention of the driver to a failure condition. For the second function, that is, the blocking action, the hydraulic pressure in the system, which must be balanced at the inlet side and the outlet side when in a normal condition, will become unbalanced thus resulting in the closing of the device and, therefore, the blocking of the portion downstream thereof.

Figure 1:
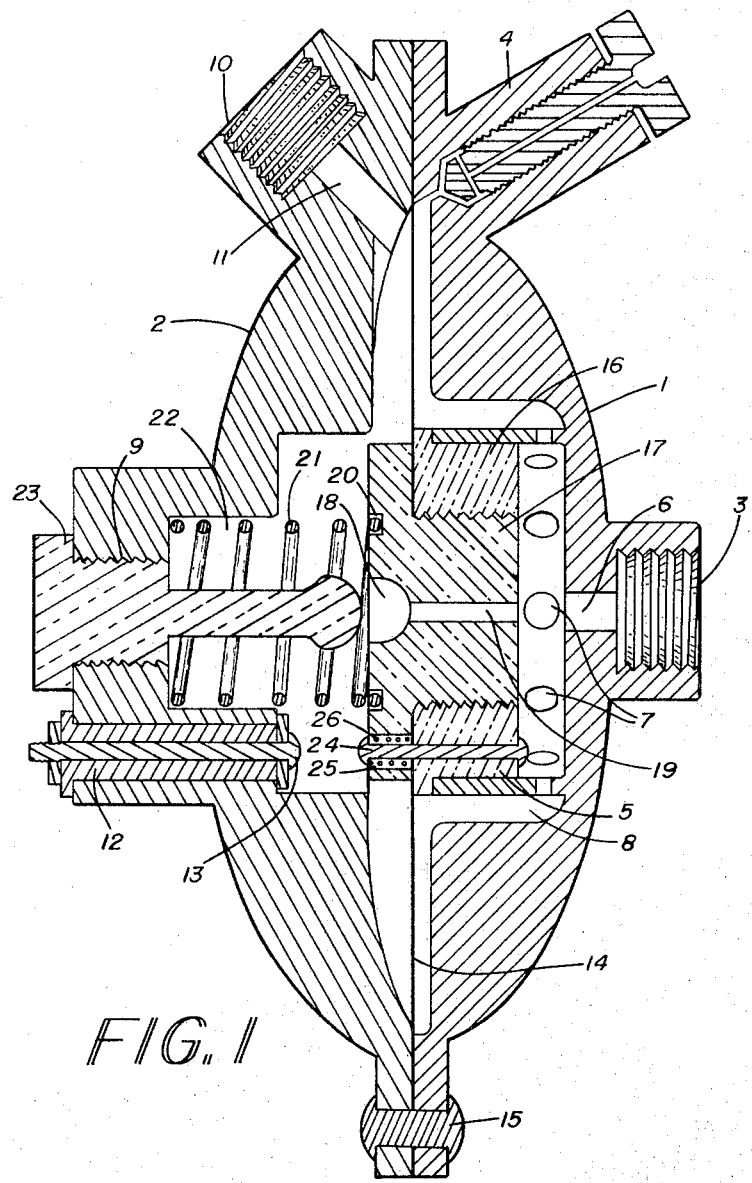
FIG. 1 is a longitudinal sectional view of the security device for hydraulic braking systems of the present invention.

Referring particularly to FIG. 1, the security device of the present invention includes a casing having a generally lenticular shape with a circular cross section, the casing being formed of two halves generally designated at 1 and 2, each of concave shape and connected to each other so as to form the lenticular casing. The casing half 1, in the illustrated embodiment, corresponds to the inlet side, and the casing half 2 corresponds to the outlet side of a fluid pressure system. The half 1 is provided at its center with a connecting mouth 3 provided with internal threads so as to threadedly be connected hermetically to a conduit (not shown) coming from a braking pump, so that the brake fluid pressurized by the pump can enter the device through mouth 3. A drain valve 4 is disposed in casing half 1 and is actuated similarly to drain valves employed in cylinders of conventional hydraulic systems presently in use.

A cylinder 5 is concentraically disposed in casing half 1 for receiving brake fluid from the connection mouth 3 through an orifice 6, the cylinder 5 projecting axially through the device beyond the casing half 1 and into the space defined by casing half 2, as shown in FIG. 1. At the base portion of cylinder 5, i.e., the portion connecting the cylinder to casing half 1, there are provided several orifices 7, concentrically arranged around cylinder 5 and communicating with a pressure chamber 8 peripherally arranged around the cylinder 5 so as to provide a passage for fluid between the interior of cylinder 5 and pressure chamber 8.

Casing half 2, which defines the outlet side of the device, has a central threaded opening 9 therein which projects exteriorly from casing half 2 and protrudes substantially therefrom. At the top of casing half 2 there is an outlet mouth 10 communicating with pressure chamber 8 through an orifice 11 to pass fluid from the outlet 10 to brake applying devices via conduits (not shown).

A fixed contact 13 of the failure-indicating electric system, to be disclosed in more detail hereinafter with respect to FIG. 2, extends through a bore in a member 12 disposed in casing half 2 adjacent opening 9. As clearly seen in FIG. 1, threaded opening 9 of casing half 2 houses a piece 23 threadedly connected thereto and projecting axially inside the casing half 2 in order to define an elongated body or plug portion.

All the above discussed structure can be defined as the fixed or unmovable parts of the security device of the present invention. The movable portion of the security device of the present invention includes a diaphragm 14 having its periphery fastened between casing halves 1 and 2 with a pressure tight seal by rivets 15. Diaphragm 14 extends transversely to the axis of the casing and is centrally clamped between a nut 16 of a plunger movable in cylinder 5 and including the body of a blocking valve 17, cooperating with nut 16 and having, at its central axis, a trap cavity 18 communicating by means of an axial passage 19 with the chamber defined by cylinder 5 and communicating with inlet mouth 3 via passage 6 so as to provide a straight and unobstructed path for fluid flow.

The body of the blocking valve 17, in the free face thereof, is provided with a circular concentric groove to seat an end of a spring 21 partially housed in a cavity 22 formed in casing half 2, the spring 21 being mounted in compression between casing half 2 and blocking valve body 17 and surrounding the elongated portion extending from piece 23.

Referring now to FIG. 2, there is shown a portion of the security device of the present invention forming the electrical contacts to which access can be had by means of the member 12. As can be clearly seen in the figure, the electrical contacts are formed of a fixed contact 13 and a movable contact 24, the former located in the casing half 2 and the latter in the casing half 1. The movable contact 24 is formed by a rod headed at the ends thereof and housed in aligned bores in nut 16 and blocking valve 17.

At the lower portion of the end face of blocking valve 17, towards the left-hand side as seen in FIG. 2, the bore increases its diameter to form a small, axially extending cavity 25 housing a small spring 26 bearing against the inner portion of movable contact 24 in order to maintain contact 24 projected normally towards fixed contact 13. Fixed contact 13 extends longitudinally through the entire bore in member 12 and is fastened at the opposite end by a nut 28 insulated by means of an insulating washer 29 and permanently connected, by welding for instance, to a connection terminal 27 in order to make electrical contact with a circuit to be discussed below with reference to FIG. 4.

Referring now to FIG. 3, there is shown a hydraulic connection diagram for a plurality of security devices in accordance with the present invention as discussed above relative to FIGS. 1 and 2. As will be obvious to those skilled in the art, the security devices are interposed in a braking system for all four wheels of a vehicle, such braking system including a brake pump 30 providing fluid to a line 31 which in turn feeds four security devices 32, 33, 34 and 35, one for each wheel. Device 32 supplies pressure fluid through a line 37 to actuate a brake cylinder 40; device 33 does the same through a line 39 to a cylinder 43; device 34 supplies a line 38 to a cylinder 42; and device 35 supplies a line 36 to a cylinder 41.

It will be obvious from the arrangement of the four security devices 32, 33, 34 and 35, that each device controls the condition and position of a determined portion of the braking system, that is, the portion relating to one of the wheels, so as to detect failures in each portion of the system and, in a given case, to block the respective portion thereof in order to avoid the braking system as a whole becoming inoperative by maintaining enough pressure in the rest of the system and leaving out of the system the damaged and blocked portion thereof.

Figure 4:
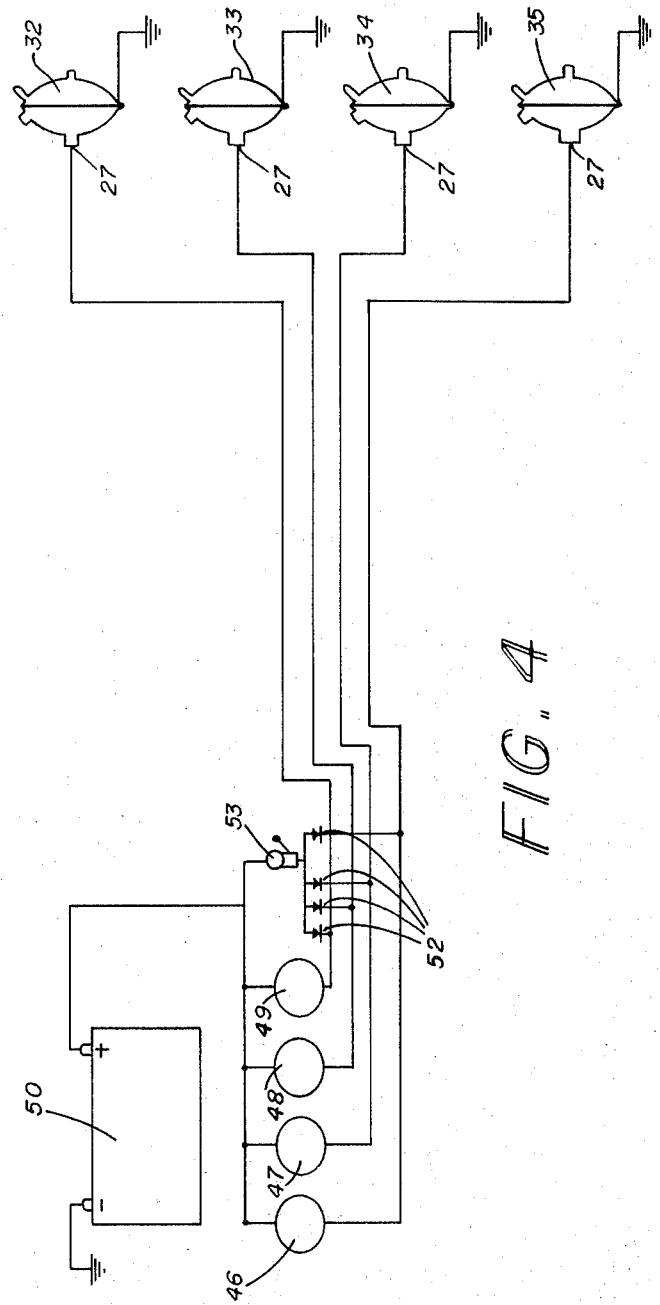
FIG. 4 is an electric diagram showing the circuits cooperating with the security device of the present invention for connecting the same to a failure-indicating board.

FIG. 4 shows an electrical circuit diagram suitable for use with the security devices of the present invention. FIG. 4 illustrates a braking system for all four wheels of a vehicle, there being shown four security devices 32, 33, 34 and 35, the outer cases of which are electrically connected to a reference potential, such as ground.

Terminal 27, connected to the fixed contact 13 as above discussed relating to FIG. 2, provides a suitable means for connecting each security device with an electrical circuit for signalling failures. Thus, each terminal 27 is connected to one of the terminals of pilot lights 46, 47, 48 and 49, respectively, while the other terminal of each light is connected to the positive terminal of a battery 50, the negative terminal of which, in turn, is connected to ground.

Four diodes 52 are connected in the electrical circuit with the cathode of each connected to one of the lines coming from the security devices, while the anodes thereof are connected to a common point and feed a sound signal means 53, which is connected to the positive terminal of battery 50. Thus, any one of the security devices 32, 33, 34 and 35 closing its circuit will turn on one of the lights 46, 47, 48 or 49, respectively, and at the same time will close the circuit for the sound signal means 53, such as a bell, a buzzer or even the horn of the vehicle, or any other audible means capable of calling the attention of the driver to the abnormality in the braking system, which abnormality can be localized by means of the board shown in FIG. 5.

In the preferred embodiment, and at the same time the simpler embodiment, the board of FIG. 5 comprises a frame inside which there are the four lights or bulbs 46, 47, 48 and 49, each of which has a double identification correspondingly individualized, so as to require only a simple glance at the board when the sound signal is given by the driver in order to determine exactly and precisely in which portion of the braking system the damage, failure or blocking is located, since in any of these conditions the device of the present invention will be working.

OPERATION OF THE DEVICE

In order to provide a better understanding of the operation of the security device of the present invention, in both the signalling and blocking modes, the operation of a hydraulic brake system for all four wheels of a vehicle will be briefly described. When the brake pedal is depressed, a hydraulic pump is actuated and, through the discharge thereof, provides a pressure liquid flow which, through tubings, hoses and the like, reaches each of the four cylinders of the braking system, applying the linings against the drum or disk, as the case may be.

The failures usually presented in a system as above described, can be divided as follows:

1. Upon mismatching of the linings, the pedal has an excessive travel, occasionally requiring pumping of the pedal two or three times in order to obtain enough pressure for the braking action.

2. A loose connection in any part of the system loses liquid. When very slight, this loss implies practically no danger; but, when the loss becomes greater, the loss can result at any time in the absence of braking pressure and such absence of braking pressure cannot be detected until the brakes are required, e.g., in an emergency.

3. A worn out tubing can present failures similar to those pointed out under 2 above.

4. A worn out or broken hose also results in the same type of failures.

5. Leakage at rubbers of the cylinders also results in similar failures.

6. A failure or weakness located in any part of the system, which can be detected only in an emergency situation when the pressure applied to the brakes is greater than normal, thus subjecting the entire system to a force in excess to that which it can withstand due to the failures undetected until that moment, e.g., worn out hoses blowing out in that moment, tubings broken by the excessive pressure, etc. This is the most dangerous case, since exactly when brakes are needed with the utmost urgency, there is no pressure at all in the system.

From the above discussion, it is easy to follow the operation of the security devices of the present invention in a braking system for the four wheels of a vehicle, wherein four identical security devices are employed in the hydraulic circuit, such as is illustrated in FIG. 3, and provided with a signal board as shown in FIG. 5 connected by means of the circuit of FIG. 4.

As above discussed, the principal or main function of the device of the present invention is to provide a control device in the flow path between the cylinder at each wheel and the pedal pump, as will be described with reference to FIG. 1.

The pressure liquid coming from the pump when the pedal is pushed-down is directly fed to the inlet mouth of each security device and passes through orifice 6 to the interior of cylinder 5 and through orifices 7 to chamber 8 such that the pressure on the plunger formed by piston 16 and blocking valve body 17 and the pressure on diaphragm 14 actuates the plunger to a degree corresponding to the force applied to the pedal.

The pressure differential across the diaphragm displaces the plunger axially towards the left as seen in FIG. 1; while a small portion of the liquid passes to the other side of the outlet chamber through passage 19 and trap cavity 18. When the diaphragm-plunger assembly moves, a compression is exerted on the liquid or fluid at the outlet chamber side of the diaphragm, thus increasing the pressure to a degree corresponding to the pressure set thereon, and the fluid content will be partially driven towards the orifice 11 and discharged through discharge mouth 10, from which it passes to tubings, connections, hoses, etc., to arrive finally at the brake cylinder with exactly the same pressure as the cylinder requires on the brake drum or disk, and the braking action is thus completed.

Three different situations can be presented with this operational embodiment of the braking system with the device of the present invention:

A. The braking system is operating normally without failures in which case the operation of the security device of the present invention will be as described above.

B. There is a slight failure, and the security device indicates the same for repair purposes.

C. There is a major failure, and the security device automatically blocks that section of the system where the failure exists.

In order to make clear the following disclosure, reference is made first to condition C, to explain the operation of the security device in case of a major failure demanding the automatic blocking of the section where the failure is developed in order to avoid the complete absence of braking power for the vehicle.

The major failure can be such as that due to a considerable leakage of fluid such that pressure cannot be supplied to the brake-applying cylinder and the conduits connecting the same to the security device. Likewise, the major failure impairs a pressure condition at the proper security device so that a large travel of the plunger-diaphragm assembly is effected and, at the same time, a small amount of fluid is flowing through said passage 19 until the cooperating edges of the trap cavity 18 and the head of piece 23 are in contact, thus obstructing the only conduit through which fluid can flow to the outlet chamber side of the diaphragm. It is to be noted that both piece 23 and 17 are made from Teflon (R) or any other resilient material of similar characteristics, so that both cooperating portions can enter in a firm contact and obtain an effective occlusion.

Under such conditions, with passage 19 obstructed, pressure is high in chamber 8 causing the head of piece 23 to enter into the trap cavity and be locked therein to permanently block the passage 19 whereby the loss of fluid is avoided in the section between the outlet 10 and the corresponding brake cylinder, while permitting the remaining security devices to operate under normal pressure for providing both normal operation thereof and normal braking action.

As can be seen from a comparative study of FIGS. 2 and 1, when pieces 16 and 17 together with diaphragm 14 are moved leftward, the movable contact 24 will be carried from the normal position shown in FIG. 2, capable of being varied to the separation limit, designated by arrows A, to a contact closing position, shown by arrows B, wherein the travel thereof will be sufficient to close the circuit of FIG. 4, to make the means 53 sound and the corresponding light 46, 47, 48 or 49 to turn on at the board of FIG. 5. When portions 16, 17 together with diaphragm 14 reach the trapping position for the head within trap 18, the contacts have moved to the position of arrows C whereby the visible and audible signals will remain permanently at the board, thus indicating a continuous failure and the blocking of a section of the braking system.

Once the driver sees and hears the signal of this emergency situation, he will drive the vehicle with caution until the damage can be repaired. Upon the repair of the damage, the security device can be moved to its normal operational position; and, to this end, piece 23 can be unscrewed in order to free the head from the trap, whereby pieces 16 and 17 will return to their normal positions, carrying therewith movable contact 24 thus opening the circuit of FIG. 4 and turning off the audible and visible signals.

In case of slight failures, the trapping of the head in trap 18 is not effected since the pressure loss is small, but there is enough travel for the movable contact to contact the fixed contact, as shown by arrows B in FIG. 2, whereby the signals will be actuated to indicate that something abnormal is occurring, and must be corrected.

In absence of any failures, the device of the present invention will merely operate as a pressure transmitter for brake actuation. As above explained, the device is also provided with a conventional air draining valve 4, which valve is complemented, in each case, by the drain valve provided in each brake cylinder.

A great mismatching of the linings of any of the wheels will also cause the operation of the device of the present invention, signalling a failure condition due to the great liquid volume needed at the cylinder, thus provoking an excessive displacement of the diaphragm to the B position of the movable contact and turning on the light and the audible signal on the board.

Inasmuch as the present invention is subject to many variations, modifications and changes in detail, it is intended that all matter described above or shown in the accompanying drawings be interpreted as illustrative and not in a limiting sense.

We claim:

1. For use in a hydraulic braking system, a security device comprising a casing having inlet means, outlet means and a flow passage therebetween;

diaphragm means disposed in said flow passage to define a first chamber communicating with said inlet means and a second chamber communicating with said outlet means;

an elongate member disposed in said second chamber having a head defining a valve member; and plunger means fixed to said diaphragm means including passage means having a first end communicating with said first chamber and a second end communicating with said second chamber and defining a valve seat, said plunger means being movable with said diaphragm means such that said valve seat engages said valve member to prevent flow through said passage means in response to an abnormal pressure differential across said diaphragm.

2. The security device as recited in claim 1 wherein said head of said elongate member is formed of resilient material, and said second end of said passage means in said plunger means includes a trap cavity with a configuration mating with the configuration of said head of said elongate member such that said valve member defined by said head will be trapped in said trap cavity in engagement with said valve seat in response to said abnormal pressure differential across said diaphragm to permanently prevent flow between said first and second chambers.

3. The security device as recited in claim 2 and further comprising a first contact carried on said casing and a second contact carried on said plunger means and aligned with said first contact to contact said first contact when said plunger means moves a predetermined distance less than the distance required to trap said valve member in said trap cavity. and indicator means energized in response to contact of said first and second contacts.

4. The security device as recited in claim 3 wherein said second contact is movably mounted on said plunger means to permit movement of said second when said valve member is trapped in said trap cavity.

5. A braking system for an automatic vehicle having a plurality of wheels with a brake cylinder for each wheel comprising pressure pump means for pressurizing brake fluid;

separate conduit means for supplying brake fluid from said pressure pump means to each of said brake cylinders; and a security device disposed in each of said conduit means, each of said security devices including a casing having inlet means connected with said conduit means, outlet means connected with said conduit means and a flow passage between said inlet means and said outlet means; diaphragm means disposed in said flow passage to define a first chamber communicating with said inlet means and a second chamber communicating with said outlet means; an elongate member disposed in said second chamber having a head defining a valve member; and plunger means fixed to said diaphragm means including passage means having a first end communicating with said first chamber and a second end communicating with said second chamber and defining a valve seat, said plunger means being movable with said diaphragm means such that said valve seat engages said valve member to prevent flow through said passage means in response to an abnormal pressure differential across said diaphragm.

6. The braking system as recited in claim 5, wherein in each of said security devices said head of said elongate member is formed of resilient material, and said second end of said passage means in said plunger means includes a trap cavity with a configuration mating with the configuration of said head of said elongate member such that said valve member defined by said head will be trapped in said trap cavity in engagement with said valve seat in response to said abnormal pressure differential across said diaphragm to permanently prevent flow between said first and second chambers, and wherein each of said security devices further includes a first contact carried on said casing and a second contact carried on said plunger means and aligned with said first contact to contact said first contact when said plunger means moves a predetermined distance less than the distance required to trap said valve member in said trap cavity, said braking system further comprising indicator means connected with said contacts of each of said security devices for indicating a failure in corresponding conduit means when the first and second contacts of one of said security devices are in contact.

* * * * *